United States Patent
Kristen et al.

(10) Patent No.: US 11,964,512 B2
(45) Date of Patent: Apr. 23, 2024

(54) UTILITY VEHICLE TIRE

(71) Applicant: Continental Reifen Deutschland GmbH, Hannover (DE)

(72) Inventors: Florian Kristen, Hannover (DE); Alexander Wuest, Seelze (DE)

(73) Assignee: Continental Reifen Deutschland GmbH, Hannover (DE)

( * ) Notice: Subject to any disclaimer, the term of this patent is extended or adjusted under 35 U.S.C. 154(b) by 418 days.

(21) Appl. No.: 16/771,496

(22) PCT Filed: Sep. 24, 2018

(86) PCT No.: PCT/EP2018/075722
§ 371 (c)(1),
(2) Date: Jun. 10, 2020

(87) PCT Pub. No.: WO2019/115036
PCT Pub. Date: Jun. 20, 2019

(65) Prior Publication Data
US 2021/0178824 A1    Jun. 17, 2021

(30) Foreign Application Priority Data
Dec. 11, 2017    (DE) ............ 10 2017 222 341.3

(51) Int. Cl.
*B60C 11/13*    (2006.01)
*B60C 11/01*    (2006.01)
(Continued)

(52) U.S. Cl.
CPC ............ *B60C 11/01* (2013.01); *B60C 11/042* (2013.01); *B60C 11/1323* (2013.01);
(Continued)

(58) Field of Classification Search
CPC ..... B60C 11/01; B60C 11/042; B60C 11/045; B60C 11/1307; B60C 2011/013; B60C 2011/133
See application file for complete search history.

(56) References Cited

U.S. PATENT DOCUMENTS 2,261,025 A * 10/1941 Havens ................. B60C 11/042
152/DIG. 3
5,031,680 A * 7/1991 Kajikawa ............. B60C 11/033
152/902
(Continued)

FOREIGN PATENT DOCUMENTS

CN    102700366 A    10/2012
CN    106794713 A    5/2017
(Continued)

*Primary Examiner* — Robert C Dye
(74) *Attorney, Agent, or Firm* — Richard A. Wolf; Gregory J. Adams

(57) ABSTRACT

A utility vehicle tire having a tread with at least two circumferential channels (3), which are formed to a profile depth (T) and which separate central profile positives (1) and shoulder-side profile positives (2) from one another, the circumferential channels (3) having channel flanks (5a, 5b) toward the central profile positives (1) and the shoulder-side profile positives (2) having shoulder flanks (6) running toward the side wall. The channels have depressions delimited by a curved surface.

7 Claims, 3 Drawing Sheets

Figure 1:
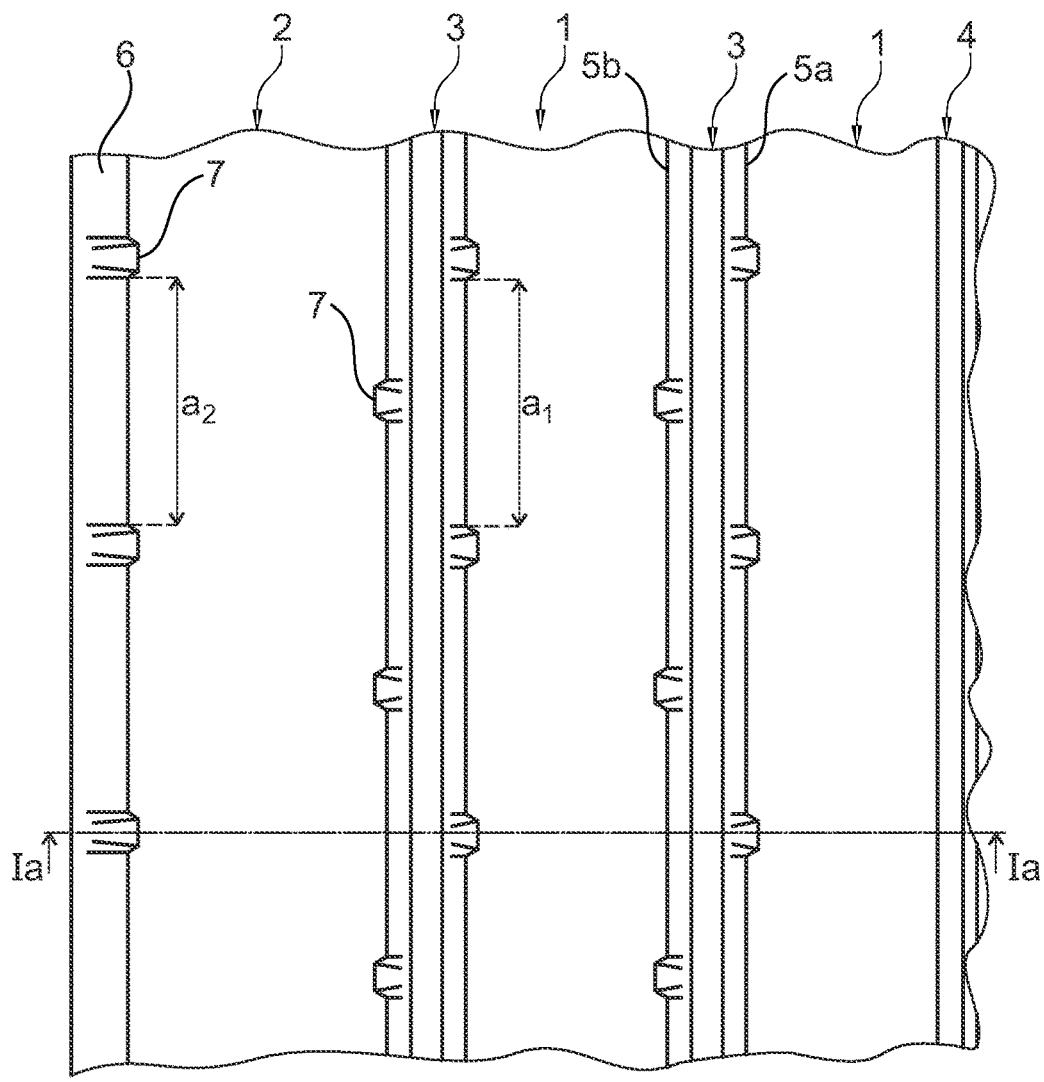

(51) Int. Cl.
   *B60C 11/04* (2006.01)
   *B60C 11/03* (2006.01)
(52) U.S. Cl.
   CPC .............. *B60C 2011/0355* (2013.01); *B60C 2011/0388* (2013.01); *B60C 2011/039* (2013.01); *B60C 2011/133* (2013.01); *B60C 2200/06* (2013.01)

(56) References Cited

U.S. PATENT DOCUMENTS

| | | | |
|---|---|---|---|
| 5,445,201 A | | 8/1995 | Kukimoto et al. |
| 9,211,765 B2 | * | 12/2015 | Ducci ................. B60C 11/1281 |
| 2008/0066841 A1 | * | 3/2008 | Mathews ............ B60C 11/1369 |
| | | | 152/209.22 |
| 2012/0247632 A1 | | 10/2012 | Hayashi |
| 2016/0144666 A1 | * | 5/2016 | Yoshida .............. B60C 11/0332 |
| | | | 152/209.24 |
| 2016/0185159 A1 | * | 6/2016 | Ookawa ................ B60C 11/125 |
| | | | 152/209.18 |

FOREIGN PATENT DOCUMENTS

| | | | |
|---|---|---|---|
| EP | 0313361 A2 | | 4/1989 |
| JP | 63166606 A | * | 7/1988 |
| JP | 2000006616 A | | 1/2000 |
| JP | 2009179148 A | | 8/2009 |

* cited by examiner

UTILITY VEHICLE TIRE

The invention relates to a utility vehicle tire having a tread with at least two circumferential channels, which are formed to a profile depth and which separate central profile positives and shoulder-side profile positives from one another, the circumferential channels having channel flanks toward the central profile positives and the shoulder-side profile positives having shoulder flanks running toward the side wall.

It is known and customary to form blind grooves running into circumferential channels, sipes, transverse channels and the like in treads of utility vehicle tires, with the effect of providing gripping edges at the periphery of the tread and in this way contributing to improving the gripping properties on wet, sandy, gravelly, muddy or snow-covered ground. In particular, superficially formed channels running into the circumferential channels may also be provided, with the effect of improving the water expulsion properties and likewise providing gripping edges at the periphery of the tread.

Especially when driving on unsurfaced and/or snow-covered ground, stresses are introduced to an increased extent into the shoulder flanks, the channel flanks and the channel base of the circumferential channels, thereby increasing the risk of cracks occurring in the region of the bases of the sipes and channels.

The invention is therefore based on the object of providing a utility vehicle tire of the type mentioned at the beginning that has a much lower susceptibility to cracks in the region of the channel bases of circumferential channels and in the region of shoulder flanks and in addition ensures good gripping properties, in particular on wet, sandy, gravelly, muddy and/or snow-covered ground.

The stated object is achieved according to the invention
- by at least one channel flank of at least one circumferential channel and/or at least one shoulder flank being provided with depressions which extend into the profile positives and are open toward the surface of the tread and which, determined in each case at the periphery of the tread, have with respect to the level of the channel flank or shoulder flank a depth of 2.0 mm to 5.0 mm and at the level of the channel flank or shoulder flank a width of 4.0 mm to 15.0 mm,
- each depression being delimited by at least one surface, the surface(s) being curved in such a way that, at its or their radially inner end(s), it or they go(es) over without a kink into the channel flank at a depth, determined in the radial direction, of 35% to 90% of the profile depth or go(es) over without a kink into the shoulder flank at a depth, determined in the radial direction, of 35% to 150% of the profile depth.

As a result of their special curvature, all of the surfaces delimiting a depression go over without a kink into the channel flank or shoulder flank. By contrast with conventional channels and sipes running into circumferential channels or running out at shoulder flanks, in the area of depressions according to the invention no stresses, or scarcely any stresses, occur at the channel or shoulder flanks, so that they are very well protected from cracks. Since the surface(s) which delimits or delimit the depressions formed at channel flanks reaches or reach at most to a depth of 90% of the profile depth, it is ensured that the surface(s) run(s) out before any cross-sectional radius of the channel base of the circumferential channel. As a result, for example in comparison with sipes formed to the profile depth, in particular, stress peaks at the channel base of circumferential channels are effectively avoided, which additionally increases the crack resistance in these regions. The surface(s) which delimit(s) the depressions formed at the shoulder flanks may reach to 150% of the profile depth. For example when driving on snow-covered ground, these depressions can take up "greater" amounts of snow, as a result of which the gripping properties in certain driving situations, for example when driving around bends, are improved by the effect of "snow to snow friction". In addition, all of the depressions provide gripping edges at the periphery of the tread, with the overall effect that the wet and snow gripping properties of the utility vehicle tire are positively influenced. Since the surface(s) reaches or reach to a depth of at least 35% of the profile depth, the gripping edges mentioned are retained even when the tread is in an advanced state of wear. The depressions provided according to the invention therefore make good gripping properties possible on ground or roadways that are difficult to drive over, while circumferential channels and shoulder flanks are at the same time protected very well from cracks.

According to a preferred variant of an embodiment, the depth of the depressions at the periphery of the tread with respect to the level of the channel flank or shoulder flank is at most 3.0 mm. Such shallow depressions have the effect of further reducing the susceptibility to cracks.

It is also preferred if the depth, determined in the radial direction, at which the surface(s) goes or go over without a kink into the channel flank is at most 75% of the profile depth. This further reduces the probability of high stresses that may possibly lead to cracks being passed to the base of the channel.

It is also preferred if the depth, determined in the radial direction, at which the surface(s) goes or go over without a kink into the shoulder flank is 70% to 120% of the profile depth.

The stresses that are introduced into the shoulder flanks, the channel flanks and the channel base during driving are further reduced if the depressions have at the radially inner end, at the level of the channel flank or shoulder flank, a width of 30% to 50% of their width at the periphery of the tread, determined at the level of the channel flank or shoulder flank.

According to a preferred variant of an embodiment, the depressions are overall U-shaped in plan view, the depressions being delimited for example by a single arcuate or U-shaped surface in plan view. Preferably, the depressions that are overall U-shaped in plan view are trapezoidal in plan view at the periphery of the tread and are delimited at the periphery by edges forming the sides of a trapezoid and by a further edge. In particular, edges forming the sides of the trapezoid have the effect of providing additional "transverse edges" at the periphery of the tread, which contribute to improving the gripping properties. In this connection, it is particularly effective if the edges forming the sides of the trapezoid that delimit the depressions at the periphery of the tread run in relation to the circumferential direction at an angle of 30° to 80°, in particular of 55° to 75°.

According to a further preferred variant of an embodiment, the depressions are delimited at the periphery of the tread by two edges that run in a V-shaped manner in relation to one another in plan view and additionally represent "transverse edges". The gripping effect of the edges is particularly pronounced if the edges running in a V-shaped manner in relation to one another in plan view run in relation to the circumferential direction at an angle of 40° to 70°, in particular of 55° to 65°.

The utility vehicle tire has very balanced, in particular uniformly improved, gripping properties if both channel flanks of at least one circumferential channel are provided with depressions, the depressions being formed alternately at the different channel flanks.

According to a preferred variant of an embodiment, the number of depressions is chosen such that depressions that are formed at the same channel flank or shoulder flank are at a spacing of 20.0 mm to 80.0 mm from one another in the circumferential direction at the periphery of the tread.

A further preferred variant of an embodiment is characterized in that the spacing of the depressions that are formed at the same shoulder flank is chosen such that at least one, preferably precisely one, depression is formed in each pitch of the tread.

Further features, advantages and details of the invention will now be described in more detail on the basis of the drawing, which schematically shows exemplary embodiments of the invention. In the drawing, FIG. 1 shows a plan view of a circumferential portion of half of a tread of a utility vehicle tire with a variant of an embodiment of the invention, FIG. 1a shows a section along the line Ia-Ia of FIG. 1, FIG. 1b shows an oblique view of a detail of the tread from FIG. 1, FIG. 2 shows a plan view of a circumferential portion of half of a tread of a utility vehicle tire with a second variant of an embodiment of the invention, FIG. 2a shows a section along the line IIa-IIa of FIG. 2, FIG. 2b shows an oblique view of a detail of the tread from FIG. 2.

Utility vehicle tires formed according to the invention are in particular tires of a radial type of construction for trucks, heavy trucks and construction site vehicles which are particularly suitable for driving on unsurfaced roads, in particular on stony, sandy, muddy or snow-covered ground.

Figure 1A:
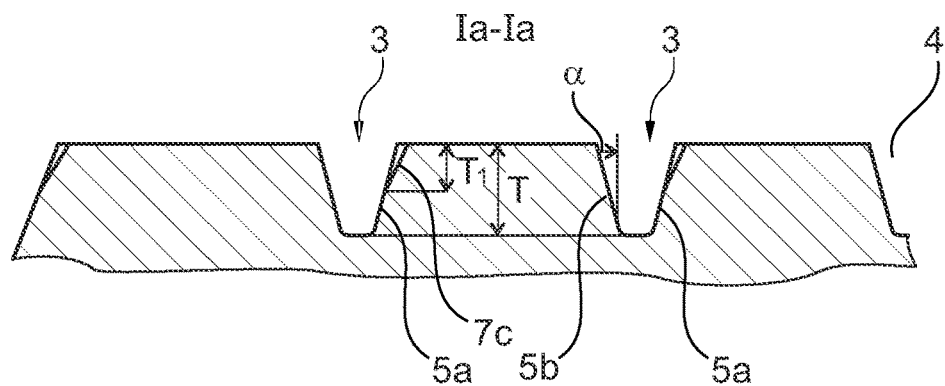
Figure 2:
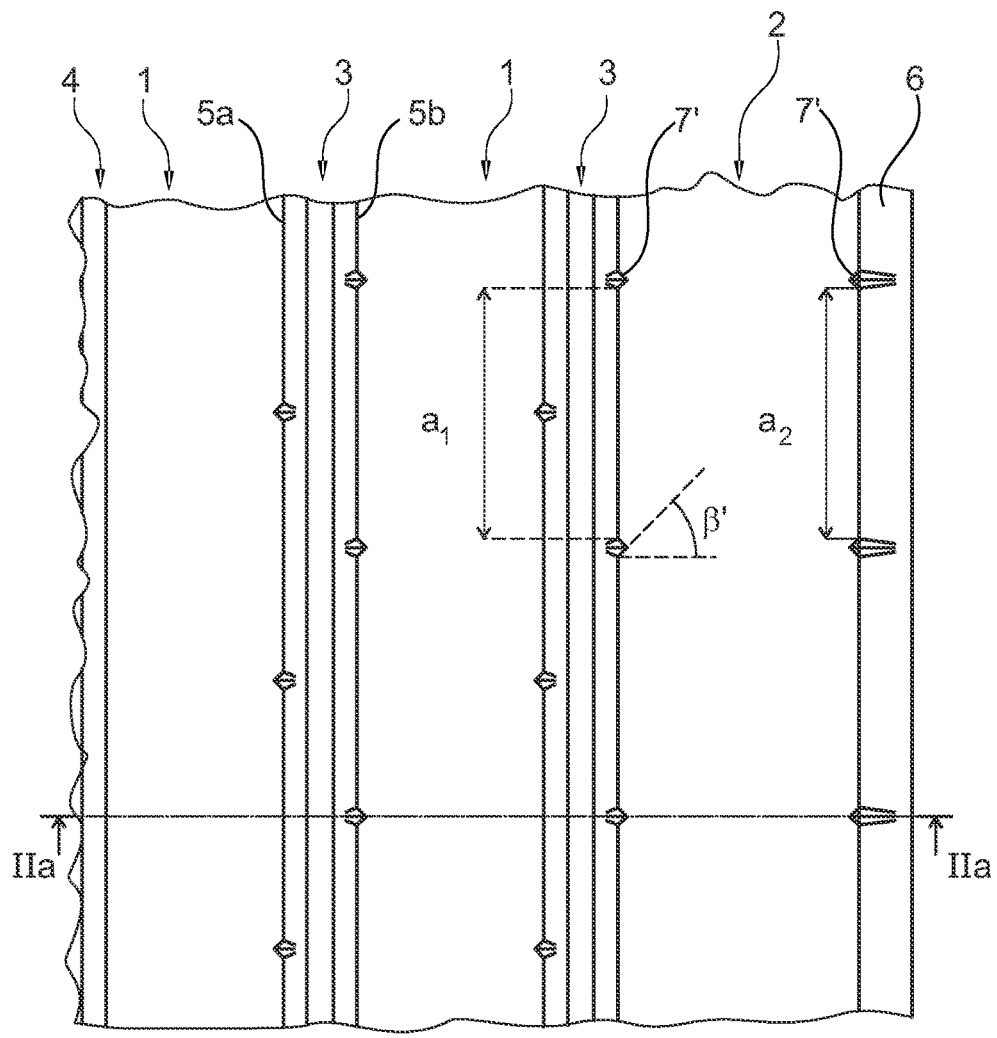

In the halves of a tread that are shown in FIG. 1 and FIG. 2, two central profile positives 1 running around in the circumferential direction and a shoulder-side profile positive 2 run within the ground contact area. The profile positives 1, 2 are only shown in a schematic and simplified form and may have a multiplicity of blocks following one another in the circumferential direction or take the form of running-around profile ribs, it being possible for the blocks or profile ribs also to be structured with sipes, channels and the like. The half of the tread that is not shown in FIG. 1 and FIG. 2 is preferably formed in a way coinciding with the half of the tread that is shown, a circumferential channel 4 that extends along the zenith of the tire and is straight in plan view, only a partial region of which can be seen in FIG. 1 and FIG. 2, running between the halves of the tread. The profile positives 1, 2 are separated from one another by circumferential channels 3 that are straight in plan view in the exemplary embodiment shown. As FIG. 1a and FIG. 2a show, the circumferential channels 3, 4 are formed to the respectively intended profile depth T, which for utility vehicle tires is usually 12.0 mm to 20.0 mm.

Figure 1B:
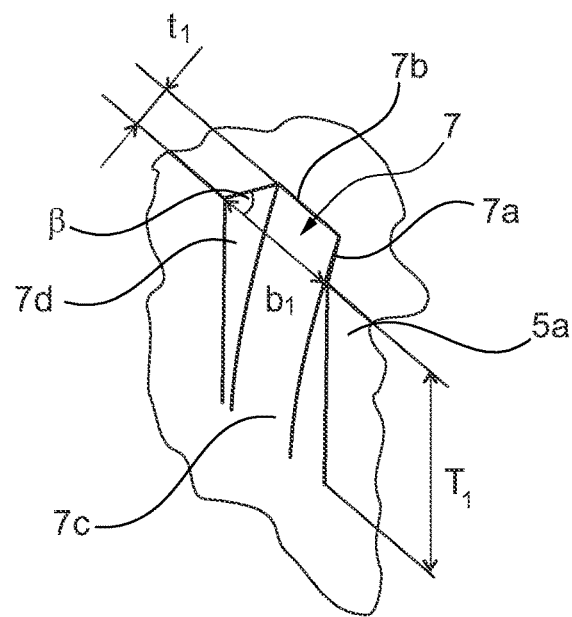
Figure 2A:
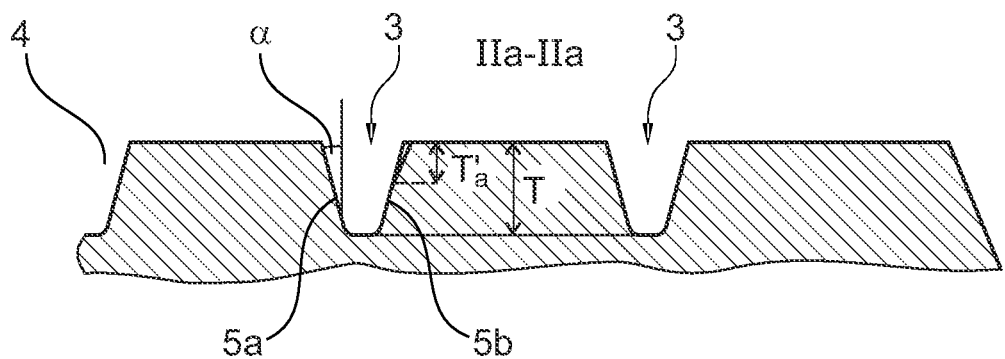
Figure 2B:
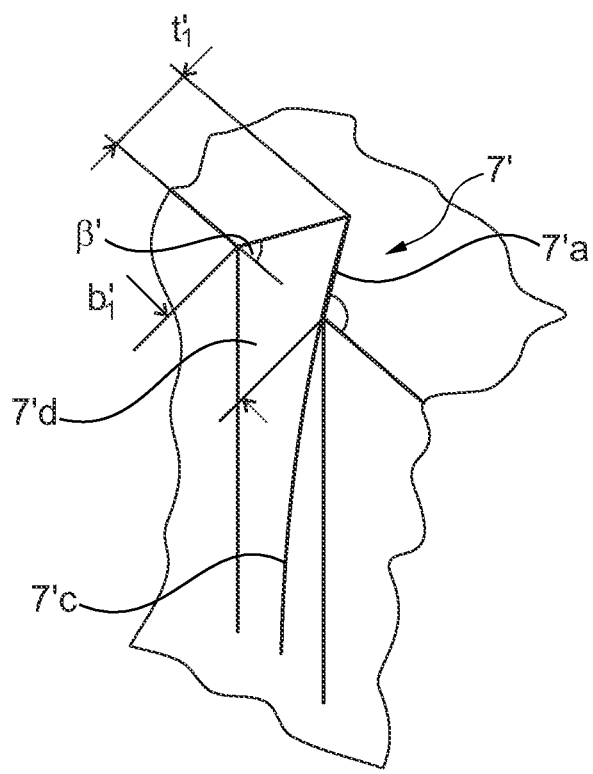

The circumferential channels 3 are delimited in each case by a tread inner-side channel flank 5a and a tread outer-side channel flank 5b, which in the case of the exemplary embodiment shown, as viewed in cross section, run in relation to the radial direction at an angle α of 10° to 20° (FIG. 1a, FIG. 2a). The shoulder-side profile positive 2 is delimited on the outer side of the tread by a shoulder flank 6, which runs around in the circumferential direction and runs in relation to the sidewall that is not shown.

Formed at the channel flanks 5a, 5b of the circumferential channels 3 and at the shoulder flank 6 are a multiplicity of depressions 7 (FIG. 1), 7' (FIG. 2) which, with respect to the level of the channel flanks 5a, 5b or the shoulder flank 6, extend into the respective profile positive 1, 2 in the axial direction and are open toward the surface of the tread.

The depressions 7, 7' directly following one another at each channel flank 5a, 5b are at spacings $a_1$ from one another in the circumferential direction of preferably 20.0 mm to 80.0 mm. The depressions 7, 7' provided at the channel flanks 5a, 5b of each circumferential channel 3 are formed alternately at the different channel flanks 5a, 5b, and therefore a depression 7, 7' formed at the channel flank 5a follows alternately in the circumferential direction after a depression 7, 7' formed at the channel flank 5b. Furthermore, in plan view, the depressions 7, 7' that are formed at the channel flank 5a are in each case midway between the two depressions 7, 7' directly adjacent to one another in the circumferential direction that are formed at the channel flank 5b.

The depressions 7, 7' formed at the shoulder flank 6 are distributed over the circumference of the tread, depressions 7, 7' that are directly following one another being at a spacing $a_2$ from one another in the circumferential direction of in particular 20.0 mm to 80.0 mm. Preferably, the spacing $a_2$ is chosen such that at least one, preferably precisely one, depression 7, 7' is formed at the shoulder flank 6 in each "pitch". "Pitches" should be understood in the known way as meaning identically designed profile portions of the tread provided at different lengths over the circumference. In the case of the variant shown in FIG. 1, the depressions 7 formed at the shoulder flank 6 are located with respect to the circumferential direction at the same positions in relation to the depressions 7 formed at the tread inner-side channel flank 5a and, in the case of the variant shown in FIG. 2, the depressions 7' formed at the shoulder flank 6 are located with respect to the circumferential direction at the same positions in relation to the depressions 7' formed at the tread outer-side channel flank 5b.

The design of a depression 7 (FIG. 1) is described below in particular on the basis of a depression 7 that is formed at the tread outer-side channel flank 5a and is shown in FIG. 1b. The depression 7 is U-shaped overall in plan view of the tread and is formed at the periphery of the tread in the manner of a trapezoid with equal sides (also see FIG. 1). At the periphery of the tread, the depression 7 is delimited by edges 7a forming sides of the trapezoid and an edge 7b oriented in the circumferential direction, the edges 7a that form sides of the trapezoid in plan view running in relation to the circumferential direction at an angle β of 30° to 80°, in particular of 55° to 75°. The depression 7 is also delimited by a bottom 7c, adjoining the edge 7b oriented in the circumferential direction, and two side surfaces 7d, adjoining the edges 7a forming the sides of the trapezoid. As viewed in cross section, the bottom 7c runs slightly arcuately and, with respect to the circumferential channel 3, outwardly convexly and, at its radially inner end, goes over without a kink into the channel flank 5a at a depth $T_1$, determined in the radial direction, from the periphery of the tread (also see FIG. 1a). Starting from the edges 7a, the side surfaces 7d turn with increasing depth toward the channel flank 5a, so that with increasing depth the inclination of the side surfaces 7d in relation to the circumferential direction is reduced continuously, the side surfaces 7d likewise going over without a kink into the channel flank 5a at the mentioned depth $T_1$.

The depth $T_1$ is 35% to 90%, in particular at most 75%, of the profile depth T. The depression 7 has in the circumferential direction, at the level of the channel flank 5a, a width $b_1$ of 10.0 mm to 15.0 mm and also at the periphery of the tread, with respect to the level of the channel flank 5b, a depth $t_1$ of 2.0 mm to 5.0 mm, in particular at most 3.0 mm.

One possible design of a depression 7' (FIG. 2) is described below on the basis of the depression 7' shown in FIG. 2b. The depression 7' is delimited at the periphery of the tread by two edges 7'a that run in a V-shaped manner in relation to one another in plan view and in plan view are oriented in relation to the circumferential direction at an angle β' of 40° to 70°, in particular of 55° to 65°. Side surfaces 7'd adjoining the edges 7'a delimit the depression 7'. The side surfaces 7'd converge at the lowest point of the depression 7' at an edge 7'c, which, as viewed in cross section of the circumferential channel 3, is slightly arcuate and, with respect to the circumferential channel 3, outwardly convex. Starting from the edges 7'a, the side surfaces 7'd turn with increasing depth toward the channel flank 5b, so that with increasing depth the inclination of the side surfaces 7'd in relation to the circumferential direction is reduced continuously, the side surfaces 7'd running out together with the edge 7'd and going over without a kink into the channel flank 5b at a depth $T_1'$.

The depth $T_1'$ is 35% to 90%, in particular at most 75%, of the profile depth T. The depression 7' has in the circumferential direction, at the level of the channel flank 5b, a width $b_1'$ of 4.0 mm to 10.0 mm and also at the periphery of the tread, with respect to the level of the channel flank 5b, a depth $t_1$ of 2.0 mm to 5.0 mm, in particular of at most 3.0 mm.

As a departure from the depression 7' shown in FIG. 2b, the depression 7', as indicated in FIG. 2, may have at the level of the channel flank 5a, 5b or shoulder flank 6 a width decreasing toward its radially inner end, the width at the radially inner end, at the level of the channel flank 5a, 5b, preferably being 30% to 50% of the width $b'_1$.

The invention is not limited to the embodiments described.

In the case of the depressions formed at the shoulder flanks, the depth, determined in the radial direction, at which the surface(s) delimiting the depressions go(es) over at its or their radially inner end into the shoulder flank may be 35% to 150%, in particular up to 70% to 120%, of the profile depth. Furthermore, the circumferential channels of which the channel flanks are provided with depressions may run in plan view in any desired manner, in particular in the form of a zigzag. The tread of the utility vehicle tire is preferably provided with two to six circumferential channels. The depressions at the channel flanks may in plan view also be designed in particular in such a U-shaped manner that the depressions are delimited by a single, arcuate surface. Furthermore, the depressions may be formed exclusively at the shoulder flanks or exclusively at the channel flanks. The width of the depressions at the periphery of the tread, determined at the level of the channel or shoulder flank, is 4.0 mm to 15.0 mm.

LIST OF REFERENCE NUMERALS

1 ... Profile positive
2 ... Profile positive
3 ... Circumferential channel
4 ... Circumferential channel
5a, 5b ... Channel flank
6 ... Shoulder flank
7, 7' ... Depression
7a, 7'a ... Ta Edge
7b ... Edge
7c ... Bottom
7'c ... Edge
7d, 7'd ... Side surface
$a_1, a_2$ ... Spacing
$b_1, b_1'$ ... Width
$t_1, t_1'$ ... Depth
T ... Profile depth
α, β, β' ... Angle

The invention claimed is:

1. A utility vehicle tire comprising:
a tread having a circumferential channel formed to a profile depth that is between a central profile positive and a shoulder-side profile positive;
channel flanks from the circumferential channel toward the central profile positive;
shoulder flanks from the shoulder-side profile positive running toward a side wall;
the channel flanks provided with a plurality of channel depressions that extend into the central profile positive and are open toward a surface of the tread and have a depth in an axial direction of 2.0 mm to 5.0 mm and a width in a circumferential direction of 4.0 mm to 15.0 mm as measured at a level of the channel flank;
the shoulder flanks provided with a plurality of shoulder depressions that extend into the central profile positive and are open toward a surface of the tread and have a depth in the axial direction of 2.0 mm to 5.0 mm and a width in the circumferential direction of 4.0 mm to 15.0 mm as measured at a level of the shoulder flank;
the channel depressions delimited by a curved channel surface that goes over without a kink into the channel flank at a channel depth of 35% to 90% of the profile depth;
the shoulder depressions delimited by a curved shoulder surface that goes over without a kink into the shoulder flank at a shoulder depth of 35% to 150% of the profile depth; and
the channel depressions each comprising:
side edges that are angled relative to the circumferential direction to form sides of a trapezoid when the channel depression is viewed in plan view;
a profile positive edge oriented in the circumferential direction that forms an upper base of the trapezoid when viewed in plan view; and
a bottom formed by the curved channel surface which runs arcuately and outwardly convexly with a continuous and constant curvature from the profile positive edge to a radially inner end where the channel depression converges with the shoulder flank and forms a lower base of the trapezoid when viewed in plan view;
wherein the side edges run at an angle (β) of 30° to 80° in relation to the circumferential direction.

2. The tire of claim 1, the curved channel surface goes over without a kink into the channel flank at most 75% of the profile depth (T).

3. The tire of claim 2, the curved shoulder surface curved goes over without a kink into the shoulder flank at a shoulder depth (T1') of 70% to 120% of the profile depth (T).

4. The tire of claim 1, the width of each of the channel depressions is greater than the depth of each of the channel depressions, as determined at the level of the channel flank.

5. The tire of claim 1, the channel depressions formed at a spacing (a1, a2) of from 20.0 mm to 80.0 mm from one another in a circumferential direction at the periphery of the tread.

6. The tire of claim 5, the spacing (a1, a2) is configured to form one of the channel depressions and the shoulder depressions in each pitch of the tread.

7. The tire of claim 1, the channel runs in the form of a zigzag.

\* \* \* \* \*